United States Patent
Cortez et al.

(10) Patent No.: US 7,986,631 B1
(45) Date of Patent: Jul. 26, 2011

(54) SCHEME FOR RANDOMIZED SELECTION OF EQUAL COST LINKS DURING RESTORATION

(75) Inventors: Bruce Gilbert Cortez, Marlboro, NJ (US); Sanja Durinovic-Johri, Aberdeen, NJ (US); Pravin Kumar Johri, Aberdeen, NJ (US); John Paggi, Bayville, NJ (US); Simon S Zelingher, Morganville, NJ (US)

(73) Assignee: AT&T Intellectual Property II L.P., Reno, NV (US)

( * ) Notice: Subject to any disclaimer, the term of this patent is extended or adjusted under 35 U.S.C. 154(b) by 74 days.

(21) Appl. No.: 12/152,962

(22) Filed: May 19, 2008

Related U.S. Application Data

(63) Continuation of application No. 10/330,893, filed on Dec. 27, 2002, now Pat. No. 7,391,732.

(60) Provisional application No. 60/401,147, filed on Aug. 5, 2002.

(51) Int. Cl.
*G08C 15/00* (2006.01)
*H04L 12/26* (2006.01)
*G06F 15/173* (2006.01)

(52) U.S. Cl. .......... 370/238; 370/255; 370/241
(58) Field of Classification Search .......... 370/238, 370/238.1, 254, 255, 389, 392; 709/240, 709/241, 242
See application file for complete search history.

(56) References Cited

U.S. PATENT DOCUMENTS

| | | | | |
|---|---|---|---|---|
| 5,233,604 A | * | 8/1993 | Ahmadi et al. | 370/238 |
| 5,317,566 A | * | 5/1994 | Joshi | 370/238 |
| 5,506,840 A | * | 4/1996 | Pauwels et al. | 370/397 |
| 6,301,244 B1 | * | 10/2001 | Huang et al. | 370/351 |
| 6,611,874 B1 | * | 8/2003 | Denecheau et al. | 709/239 |
| 6,697,333 B1 | * | 2/2004 | Bawa et al. | 370/238 |
| 6,977,931 B1 | * | 12/2005 | Hadziomerovic | 370/392 |
| 7,219,159 B2 | * | 5/2007 | Mouri et al. | 709/241 |
| 2002/0083194 A1 | * | 6/2002 | Bak et al. | 709/238 |
| 2002/0112074 A1 | * | 8/2002 | Lau | 709/241 |
| 2003/0174654 A1 | * | 9/2003 | Tateson et al. | 370/238 |

* cited by examiner

*Primary Examiner* — Warner Wong

(57) ABSTRACT

The present invention relates generally to restoration of services in a network. More particularly, the invention encompasses a scheme for randomized selection of equal cost links during restoration in a communication network. The invention further includes multiple schemes for restoring services. The network could consist of optical, ATM, FR, or IP/MPLS switches and cross-connects.

14 Claims, 2 Drawing Sheets

SCHEME FOR RANDOMIZED SELECTION OF EQUAL COST LINKS DURING RESTORATION

CROSS-REFERENCE TO RELATED APPLICATIONS

This is a continuation of U.S. patent application Ser. No. 10/330,893, filed Dec. 27, 2002, now U.S. Pat. No. 7,391,732 which claimed the benefit of provisional patent application No. 60/401,147, filed Aug. 5, 2002, entitled "A scheme for randomized selection of equal cost links during restoration."

FIELD OF THE INVENTION

The present invention relates generally to restoration of services in a network. More particularly, the invention encompasses a scheme for randomized selection of equal cost links during restoration in a communication network. The invention further includes multiple schemes for restoring services.

BACKGROUND INFORMATION

This invention relates to circuit-based communication networks, such as, an optical switch or optical cross connect network, an ATM network, a Frame Relay network, a network of MPLS (Multi-Protocol Label Switching) enabled label switched routers, a network of Lambda (optical wavelength) routers, to name a few. In all such networks, circuits are provisioned between pairs of switches and numerous classes of services are carried on these circuits. Certain classes of circuits can be given preferential treatment over others. For example, there may be two classes of service—Premium and Basic—and Premium service circuits may receive priority treatment over any Basic service circuit.

These communication networks also consist of a number of switches which are connected by communication links. There could be multiple links between a given pair of switches and not every pair of switches needs to be connected to each other. Links could be of various sizes that are generally expressed in bandwidth units such as DS3, OC3, OC12, OC48, to name a few.

All these networks use routing and signaling protocols to automate a variety of functions, such as, for example, self-discovery of network resources, construction and maintenance of an identical link-state database of routing information across all switches (within an "Area", "Peer Group," etc.), automatic provisioning and restoration of circuits, determination of paths for provisioning and restoration of circuits, detection of network failure conditions, flooding of information related to any change in the state of the network to all switches, including failures of switches and links, change in available bandwidth on a link, to name a few.

The routing and signaling protocols, including OSPF, MPLS, PNNI, etc. and variants of these standard protocols, have been adapted to specific networks or applications.

These networks are characterized by the fact that the intelligence is distributed in every switch and is not centralized in one or more central locations. Typically, all switches run the same set of protocols although the functions performed by the switches may vary somewhat based on how switches are used. For example, "border switches" in an OSPF domain have greater functionality than other switches. Thus, the switches while employing the same or similar protocols operate independently of each other. Any co-ordination of activities between switches is done by sending messages to each other in ways prescribed by the routing and signaling protocols.

Communication circuits are established over a path or a sequence of links and switches through the network. Many of the current routing protocols always pick the shortest path with available capacity. Ties between equally short paths are typically broken in fixed order but could employ many known methods to make the choice.

While the routing protocols aim at disseminating network state information throughout the network in a timely fashion, this process also uses up valuable processing resources to formulate the routing messages and to send them out, as well as to assimilate the information that is received from the routing messages. Consequently, there is a trade-off between the rate at which routing messages are sent with updated network information, and the amount of processing resources devoted to process just the routing messages. In order to address this concern various timers are used by the routing protocols (as well as the signaling protocols) to control the rate at which these messages are sent. For example, updates of available bandwidth on a link may be sent no more than once every second, and therefore, the routing information may not be completely up to date. This is particularly true when a number of network events happen in a short amount of time, as is typically the case during a network failure involving the release and restoration of many circuits.

Also, in any large network failure scenario when multiple circuits are affected, there will be multiple switches that are source switches to these failed circuits. These switches initiate restoration in a "distributed" fashion, that is, without any co-ordination between the various switches. It is also well established that restoration for a failed circuit starts as soon as the source switch receives a release message for that circuit. Furthermore, the switches invoke the same algorithm for obtaining restoration paths and generally have identical link-state routing databases on which this path is calculated.

The source switch sets up a circuit for service or restoration using the signaling protocol. A setup message is sent out along the selected path of the circuit. Each switch in the path checks to see if the requested resources are available and then allocates the resources to the circuit. If all switches are able to allocate the resources then the setup succeeds otherwise it fails. An unsuccessful setup attempt typically results in a crankback to the source switch that then tries to set the circuit up on a different path.

As is well known in the prior art that the same Dijkstra implementation runs in every switch on identical link-state routing databases. There may be multiple links available to restore circuits between a pair of switches. The Dijkstra implementation breaks ties in a fixed manner always picking the same link. These facts together mean that different switches, and even different restoring circuits on the same switch, pick restoration paths that may contain the same selected link whenever there is a choice between equal weight links. Consequently, when many circuits fail, their restoration paths contain the same link between a pair of nodes, even though there may be several parallel links available. Hence, only some of the circuits will be able to restore before the available bandwidth is exhausted on the targeted link and the rest will crank back. Further, the routing updates as circuits restore may be delayed, and so all switches may pick the same link the next time they calculate the restoration path. Thus, there is need for a method that selects more than one link whenever there are several links between a pair of switches for calculating restoration paths, but continues to select just one link for service provisioning.

However, this invention overcomes the problems of the prior art. The invention works to restore services in a network. More particularly, the invention encompasses a scheme for randomized selection of equal cost links during restoration in a communication network. This leads to an efficient process for all service restoration.

PURPOSES AND SUMMARY OF THE INVENTION

The invention is a scheme for randomized selection of equal cost links during restoration in a communication network.

Therefore, one purpose of this invention is to randomly select equal cost links during restoration in a communication network.

Another purpose of this invention is to provide restoration of communication service in a very efficient and economical manner.

Therefore, in one aspect this invention comprises a method for path generation request for restoration within a failed communication network having a plurality of switches, links and circuits, comprising the steps of:

pruning links that do not meet quality of service requirements of the circuit, deleting all links with weight greater than X for each switch pair with a plurality of links, where X is the minimum of the weights of these links, probabilistically selecting one link according to a chosen rule for each switch pair with remaining multiple links, and running a Dijkstra's algorithm on the remaining network and obtaining the shortest path for the request for restoration for the failed communication network.

In another aspect this invention comprises a method for path generation request for restoration within a failed communication network having a plurality of switches, links and circuits, comprising the steps of:

pruning at least one link that does not meet quality of service requirements of at least one circuit, deleting at least one link with weight greater than X for each switch pair with a plurality of links, wherein X is a minimum weight of at least one link, deleting at least one link for each switch pair, wherein said one link is chosen randomly from the remaining plurality of links, and running a Dijkstra's algorithm on the remaining network and obtaining the shortest path for the request for restoration for the failed communication network.

In still another aspect this invention comprises a program storage device readable by machine, tangibly embodying a program of instructions executable by the machine to perform method steps for path generation request for restoration within a failed communication network having a plurality of switches, links and circuits, the method steps comprising:

pruning links that do not meet quality of service requirements of the circuit, deleting all links with weight greater than X for each switch pair with a plurality of links, where X is the minimum of the weights of these links, probabilistically selecting one link according to a chosen rule for each switch pair with remaining multiple links, and running a Dijkstra's algorithm on the remaining network and obtaining the shortest path for the request for restoration for the failed communication network.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION

Figure 1:
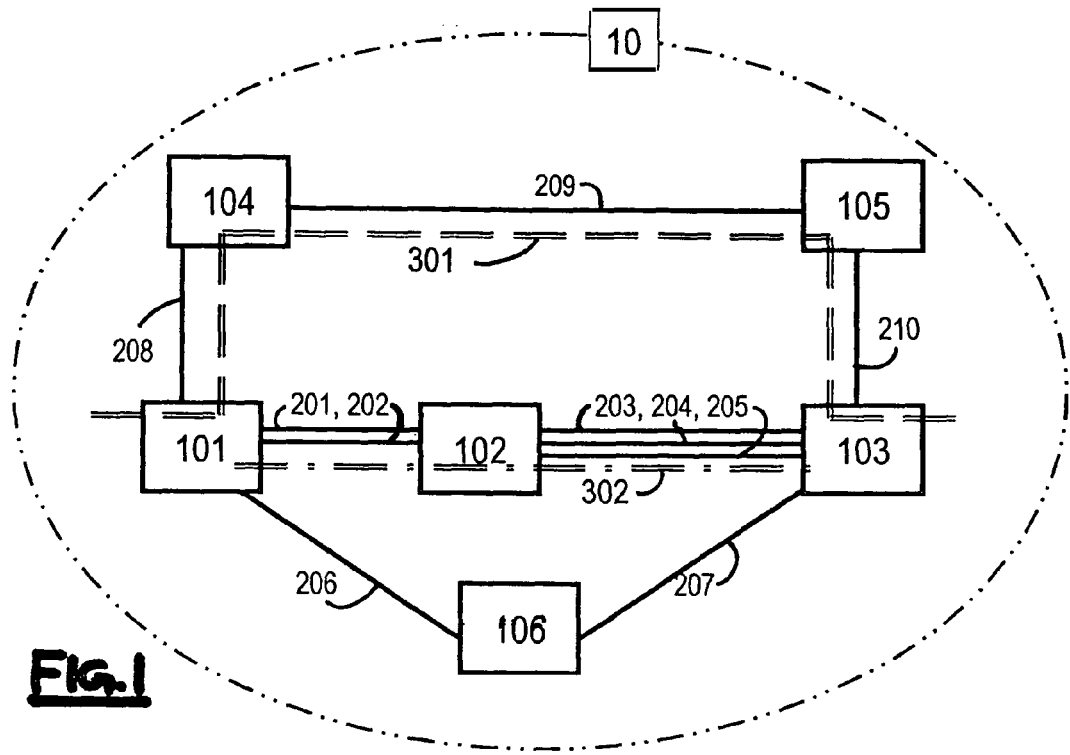
FIG. 1 is an exemplary network which is used to illustrate the present invention.

The prior art provides a plurality of methods and apparatus for provisioning a new (service) circuit. For example, in one embodiment a new circuit order between a pair of switches may be provisioned as follows:

One of the switches would be selected as the "source" of the circuit and the other as the "destination."

The "source" switch then would calculate a path for the circuit using information collected by a routing protocol. The information typically includes network topology, available network resources, to name a few. The path preferably must have sufficient network resources to meet the quality of service requirements, for example, bandwidth, delay, to name a few, of the circuit.

The "source" switch then would set up the circuit using the signaling protocol. A "setup" message is then sent out along the selected path of the circuit. Each switch in the path checks to see if the requested resources are available and then allocates the resources to the circuit. If all switches are able to allocate the resources then the setup succeeds otherwise there is failure along the path. An unsuccessful setup attempt may result in a "crankback" to the "source" that it then tries to set the circuit up on a different path. It is preferred that the new path also has sufficient resources to meet the needs of the circuit.

Circuit paths in a network are generated in a variety of ways. For example, paths can be generated by using variants of Dijkstra's shortest path algorithm. This algorithm takes advantage of the fact that each link typically has a provisioned administrative weight. Links may be bi-directional and may have different weights in either direction but this issue will be ignored for the sake of simplicity. The weight of a path is the sum of the weight of the links in the path. Dijkstra's algorithm seeks to find the path with the minimum weight. It is possible that there may be several paths with identical weights. This is particularly the case when there are several links between a given pair of nodes. Typically, many of these links may be assigned the same weight. Under these conditions substituting one link for another will result in paths with identical weight.

While the Dijkstra algorithm can be found in most books on graph theory, most descriptions of the algorithm do not address the scenario when there are multiple (parallel) links between a pair of switches. From a theoretical perspective, the least weight parallel link should be selected and the remaining links should be discarded. Ties among equal weight links can be broken arbitrarily, since the only aim is to find the least weight path. Now one is left with the case where there is a single link between switches. In real networks, there is a secondary criterion, such as filling up a link before starting to fill the next link. To accomplish this, typical Dijkstra implementations select among equal weight links (and sometimes paths) in a fixed order. These implementations try to fill up the selected link before another link is selected and in this manner try to maximize the fill of the links with circuits on them. The resulting effect is to leave the remaining links empty and thus capable of accepting large circuits.

Under other conditions a hash function defined on certain parameters could be used to distribute the various circuits over the different links available in a pseudo-random fashion. The hash function concept is more common in traditional IP (Internet Protocol) networks that typically do not do any restoration of circuits.

In pure circuit networks, such as, optical networks, it is preferred to leave the maximum available space on (some) links to accommodate large circuits. However, randomized link selection defeats this objective, as circuits will occupy (some) space on all links.

Whenever there is a failure, such as, a fiber cut, switch failure, to name a few, a number of circuits may be impacted. Normally, the switches adjacent to the failure first detect the failure condition. These switches identify the circuits affected by it, and then initiate signaling messages to release these circuits. The "release" messages travel back to the "source" and the "destination" of the circuit, releasing all resources held by the circuit along the way. The source switch then determines a new path and tries to establish the failed circuit on this new path. This is called restoring the circuit. The new path must have sufficient resources to meet the needs of the circuit. It must also avoid the failed part of the network. Information about the failed part is disseminated by the routing protocol but there may be a short delay in getting this information. The release and/or crankback message may also contain information regarding where the circuit (setup) failed. Generally, the procedure used to restore the circuit is similar to the method used to provision it in the first place, however, often there are some variations. In some cases switches pre-calculate a restoration path for each circuit. If this is the case then this path is attempted first whenever the circuit fails. However, if the setup or restoration attempt on this pre-calculated path fails, then the Dijkstra algorithm may be used to obtain a new path.

Unsuccessful restoration attempts also result in crankbacks, and it is also possible that a circuit may crankback a plurality of times before it is finally restored. Each crankback increases the amount of time the service associated with the circuit suffers an outage and it is also desirable that the number of crankbacks be minimized. The failed circuits all compete for the same available network resources during restoration. It is also possible that there are insufficient network resources to restore all failed circuits. In this case, some of the circuits will not restore and remain in the failed state.

It should also be understood that often there are many types of services that comprise the various circuits. It is an accepted practice to release the failed circuits in a priority order based on the type of service, and also to initiate the re-establishment of circuits in a similar priority order. Thus, the higher priority Premium service circuits may be released first and then the lower priority Basic service circuits are released. Similarly, at the source nodes of the released circuits, restoration may be attempted first for the Premium class of circuits and then for the Basic class of circuits.

For successful restoration, particularly with large failure events such as fiber cuts, there must also be adequate spare (restoration) bandwidth in the network. Often a fiber cut takes out several links. Consequently, the network may maintain many spare links worth of restoration capacity on potential restoration paths. Since failures can occur anywhere in the network, spare restoration capacity is maintained throughout the network.

Once the failure conditions are cleared from the network, the restored circuits may be "reverted" back to their original (service) paths from the restoration paths. This involves releasing the circuit on the restoration path and then setting it up on the original path. The switches typically maintain a record of the original path. Since failure conditions are typically repaired within a short period of time, such as, within a few hours, restoration is considered temporary. A service that may stay up for many months or years and service provisioning are considered (more) permanent. Thus, as it is desirable to calculate the "best" path during provisioning, restoration may be attempted on any available path, however undesirable. For example, the restoration path may be very long and the restored circuit may thus hold on to a lot of network resources. However, it should be remembered that the circuit will (soon) give up these resources when it reverts.

FIG. 1 is an exemplary network 10 which is used to illustrate the present invention. The network 10 has a plurality of switches (SW) 101-106 and a plurality of point-to-point communication links 201-210, as more clearly illustrated in FIG. 1. In a typical network 10, switches 101-106 are connected with point-to-point communication links 201-210—for example, OC48 (Optical Carrier level 48), OC12, OC3, DS3 communication links, to name a few. One can also have multiple links between a pair of switches. Each link 201-210 is bi-directional, with potentially different characteristics in each direction. For example, each link could have different bandwidth (BW) and administrative weight between each direction. For the sake of simplicity, the invention will be illustrated assuming that all the links have the same characteristics in either direction. Switches 101-106 can also automatically discover network and set up circuits using known link-state routing and signaling protocols. Examples of such switches are optical switches, ATM switches, FR switches, and IP/MPLS routers, and examples of protocols are OSPF (Open Shortest Path First), PNNI (Private Network-to-Network Interface), MPLS (Multi-Protocol Label Switching), to name a few, or the switches can be provisioned with network information. Multiple links can also be grouped into an "aggregated link" to ease burden of link-state protocol (not shown). Circuits are established between a pair of switches and the circuit could traverse multiple switches in between. The (service) route of the circuit is the set of links (and switches) on which it is set up. For ease of understanding, the rest of the invention will be described in terms of optical switches and OC48 links between switches. The point-to-point communication links 201 and 202 connects switch 101 and switch 102 to each other. While, the point-to-point communication links 203, 204 and 205 connects switch 102 and switch 103 to each other.

For the purpose of understanding this invention, let us also assume that there is a failure within the network and that a circuit is being restored. As shown in FIG. 1 the service was routed along service route 301, which would include switches 101, 104, 105 and 103, and links 208, 209 and 210, and the restoration is being done along restoration route 302, which would include switches 101, 102 and 103, and one of the two parallel links 201, 202 and one of the three parallel links 203, 204, 205.

Figure 2:
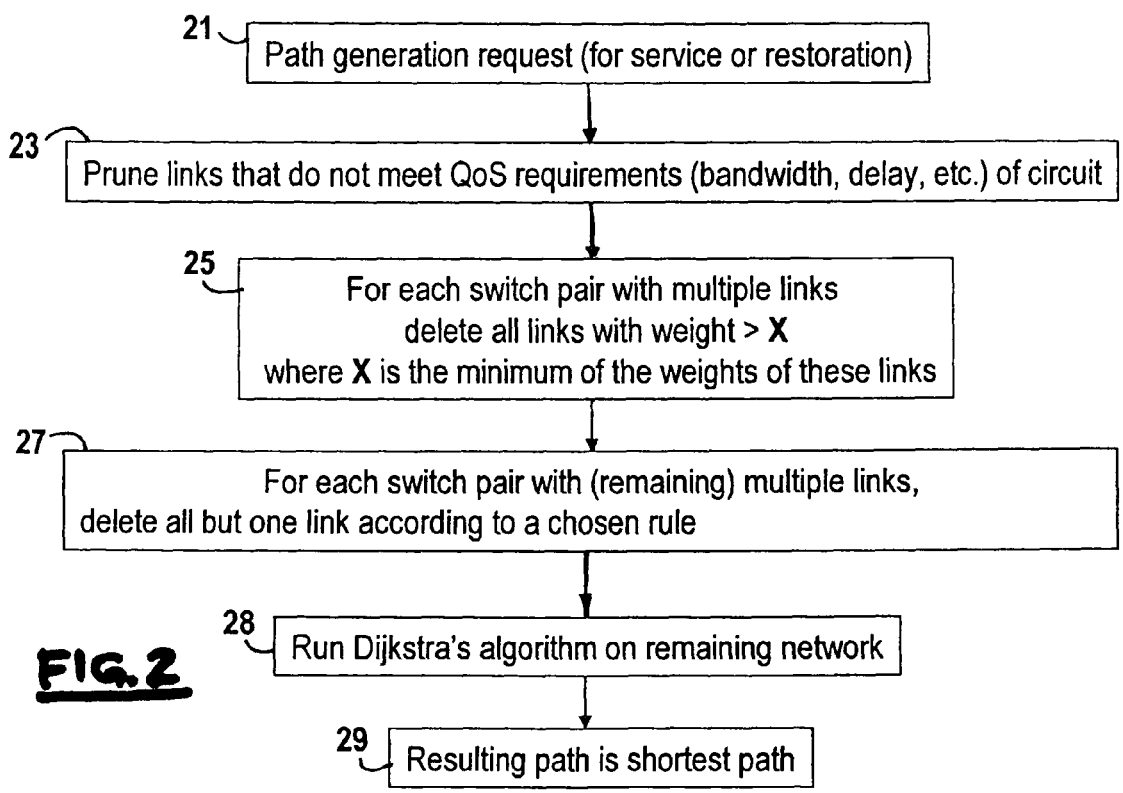
FIG. 2 is a flow diagram to illustrate service/restoration path generation.

FIG. 2 is a flow diagram to illustrate service/restoration path generation. At step 21a path generation request for service or restoration is received. At step 23 the system prunes links that do not meet QoS (Quality of Service) requirements, such as, bandwidth, delay, to name a few, of the circuit. At step

25 for each switch pair with multiple links all links with weight greater than say X are deleted, where X is the minimum of the weights of these links. At step 27 for each switch pair with multiple links that are remaining the system deletes all but one link according to a chosen rule, such as, select the link that appears first in the list of links, or select the link that appears last in the list of links, or select the link that has minimum available bandwidth, or select the link that has maximum available bandwidth, or select the largest link in terms of total bandwidth, to name a few. At step 28, the Dijkstra's algorithm is then run on the remaining network. At step 29 the resulting path would be the shortest path. For the ease of understanding the steps that might be taken if a path is not found have not been discussed.

As is well known in the prior art that the same Dijkstra implementation runs in every switch on identical link-state routing databases. There may be multiple links available to restore circuits between a pair of switches. The Dijkstra implementation breaks ties, either between equal weight links or equal weight paths, in a fixed manner always picking the same link. These facts together mean that different switches, and even different restoring circuits on the same switch, pick restoration paths that may contain the same selected link whenever there is a choice between equal weight links. Consequently, when many circuits fail, their restoration paths contain the same link between a pair of nodes, even though there may be several parallel links available. Hence, only some of the circuits will be able to restore before the available bandwidth is exhausted on the targeted link and the rest will crank back. Further, the routing updates as circuits restore may be delayed, and so all switches may pick the same link the next time they calculate the restoration path. Thus, there is need for a method that selects more than one link whenever there are several links between a pair of switches for calculating restoration paths, but continues to select just one link for service provisioning.

Figure 3:
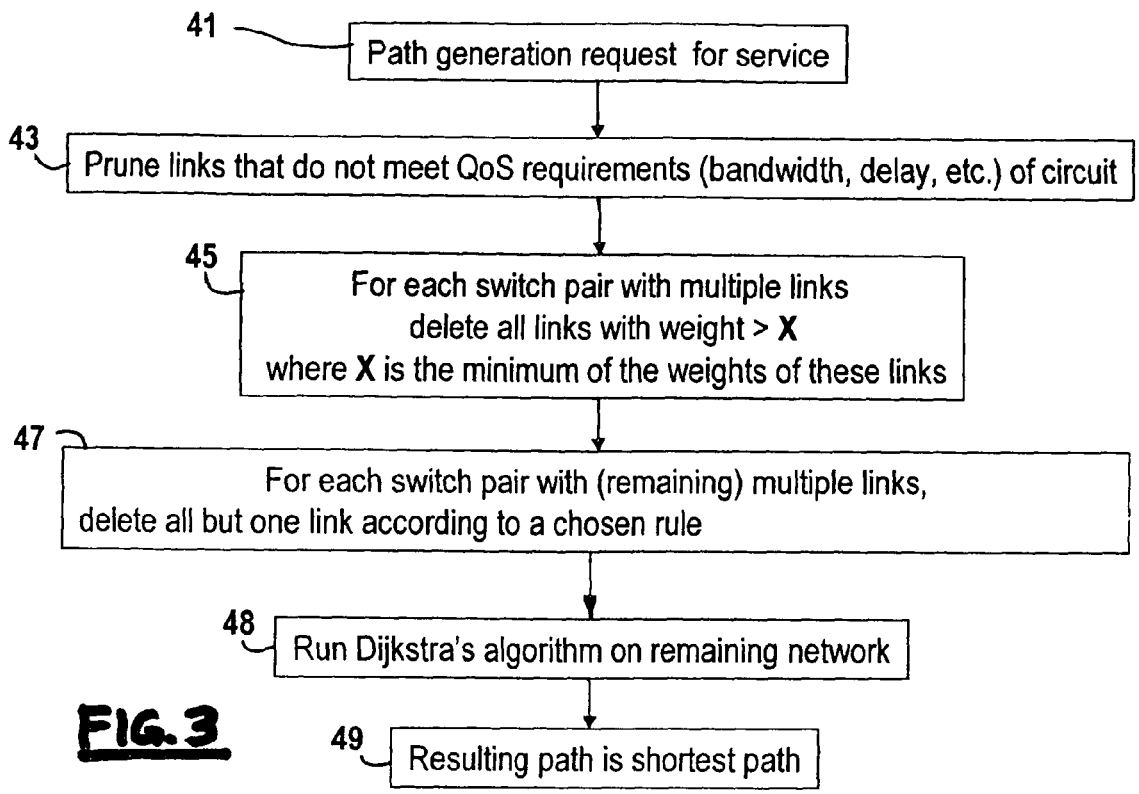
FIG. 3 is a flow diagram to illustrate a process for service path generation.

FIG. 3 is a flow diagram to illustrate a process for service path generation. At step 41 a path generation request for service is received. At step 43 the system prunes links that do not meet QoS (Quality of Service) requirements, such as, bandwidth, delay, to name a few, of the circuit. At step 45 for each switch pair with multiple links all links with weight greater than say X are deleted, where X is the minimum of the weights of these links. At step 47 for each switch pair with multiple links that are remaining the system deletes all but one link according to a chosen rule, such as, select the link that appears first in the list of links, or select the link that appears last in the list of links, or select the link that has minimum available bandwidth, or select the link that has maximum available bandwidth, or select the largest link in terms of total bandwidth, to name a few. At step 48, the Dijkstra's algorithm is then run on the remaining network. At step 49 the resulting path would be the shortest path. For the ease of understanding the steps that might be taken if a path is not found have not been discussed.

Figure 4:
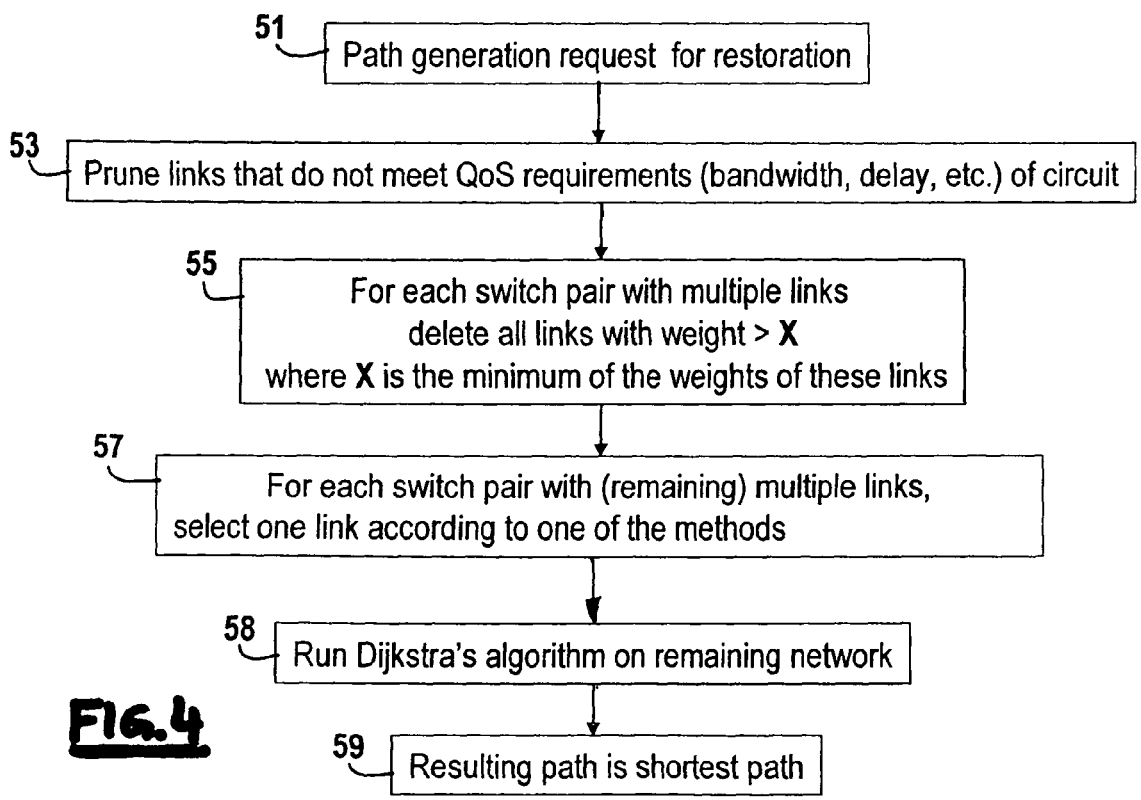
FIG. 4 is a flow diagram to illustrate restoration path generation according to an embodiment of the present invention.

FIG. 4 is a flow diagram to illustrate restoration path generation according to an embodiment of the present invention. At step 51 a path generation request for restoration is received. At step 53 the system prunes links that do not meet QoS (Quality of Service) requirements, such as, bandwidth, delay, to name a few, of the circuit. At step 55 for each switch pair with multiple links all links with weight greater than say X are deleted, where X is the minimum of the weights of these links. At step 57 for each switch pair with multiple links that are remaining the system probabilistically selects one of n equal weight links according to one of many embodiments of this invention. Here it is assumed that steps 53 and 55 in FIG. 4 have been successfully performed. A probability of selection to each link is first assigned. One embodiment of this invention is to assign an equal probability of selection (=1/n) to each link. Another embodiment of this invention is to assign probability of selection in inverse ratio of available bandwidths. For example, Let available bandwidth of link j be denoted as aw(j) and let aw(total)=the sum of available bandwidths of all n links, then, probability of selection of link j equals aw(j) divided by aw(total).

The next step would be to use a random number generator to pick one link based on probability of selection.

Then at step 58, the Dijkstra's algorithm is run on the remaining network. At step 59 the resulting path would be the shortest path. For the ease of understanding the steps that might be taken if a path is not found have not been discussed.

Yet another embodiment of this invention would comprise selecting one of n equal weight links between a pair of switches in round robin fashion. Here it is assumed that steps 53 and 55 in FIG. 4 have been successfully performed. The next step would be initialization where all links between a pair of switches are put in a "circular linked-list", and the "selection pointer" is initialized to point to the first position. It should be appreciated that some of the links in the list may be pruned by step 53 or deleted by step 55 in FIG. 4. The next step would be the selection step, where starting at the pointer position, one would find the first link that is not pruned or deleted, this link would then be selected and the pointer would be moved to this position.

Thus one can see that this invention is a scheme for randomizing the selection of equal cost links during restoration only and to continue to use existing methods during service provisioning.

In circuit-based networks it is desirable to leave the maximum available space on (some) links to accommodate large circuits. Randomized link selection defeats this objective, as circuits will occupy (some) space on all links. On the other hand, if multiple circuits are restoring, and they all target the same link, then only a few will succeed depending of the available bandwidth of the link, and the remaining will fail in their restoration attempt. Targeting the same link is not a problem during service provisioning, as service is typically provisioned one circuit at a time. The same method is used for both provisioning and restoration of circuits in the current art. Our invention calls for making a distinction between service provisioning and restoration. The reason is that restoration is expected to be temporary, and the circuits will revert to their original paths once the failure condition has cleared. Thus, randomized link selection becomes an option during restoration. It may cause temporary service provisioning problems while the network failure is repaired but can significantly improve restoration performance.

With this invention each switch keeps track of whether a circuit is being restored or is being provisioned. Each time the Dijkstra function is invoked, an argument is passed to the switch indicating whether the path being calculated will be used for restoration or for service provisioning. For provisioning, whenever an equal weight link is selected between two switches to be included in a path, the Dijkstra function will pick it in a fixed order. For restoration, the selection of the link from the set of all available links is done in a randomized manner with each link having equal probability of being picked. For example, if two links have sufficient available bandwidth to accommodate the circuit, then each can be chosen with probability one-half.

This invention also addresses the probabilistic randomization scheme where each equal weight link could have a different probability of being picked. For example, the probability could be a function of the available bandwidth of the link. For example, a link with 10 units of available bandwidth could be twice as likely to be picked as a link with 5 units of available bandwidth. The probabilities could be calculated using other methods as well which are well known in the art.

In another embodiment a round robin selection scheme could be used where links are selected in a round robin manner each time a link needs to be selected between a pair of nodes. To implement this scheme, each switch needs to maintain a circular list of links and pointers, one for every node pair in the network. Each pointer would be set to point at the link selected between the node pair when Dijkstra was used last. The next time Dijkstra is run, the link selected will be the one next to the link the pointer is pointing to. And, the pointers will be adjusted after each Dijkstra run.

This invention can be easily extended to situations where a plurality of classes of services are being restored or provisioned. With this invention the highest priority service class could be restored or provisioned prior to other lower classes of services.

This invention is applicable to other MPLS-based IP (Internet Protocol) networks and the traditional ATM and Frame Relay (FR) networks as well. This invention can also be used with any communication network with switches capable of establishing circuits—for example, Frame Relay switches, ATM switches, IP/MPLS routers, Optical switches, digital and optical cross-connects, to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method performed by a communication network for choosing a path for a circuit to be established in a communication network, said path including two or more nodes and a point-to-point communication link directly interconnecting each successive pair of nodes along said path, the method comprising identifying a plurality of paths through the network between a source node of said circuit and a destination node of said circuit, at least one of said paths comprising two or more links, and at least one of said paths including a selected one of two or more point-to-point communication links directly interconnecting a particular successive pair of nodes along that path, and choosing a particular one of said paths as the path for said particular circuit, wherein the selection of said selected link includes the application of a probabilistic rule, wherein point-to-point communication links in said network have respective administrative weights, wherein said particular one of said paths is chosen as a function of the administrative weights of the point-to-point communication links of said identified plurality of paths, wherein said two or more point-to-point communication links directly interconnecting said particular successive pair of nodes have substantially identical administrative weights, wherein said two or more point-to-point communication links directly interconnecting said particular successive pair of nodes meet at least one particular quality-of-service requirement for said circuit, and wherein said substantially identical administrative weights of said two or more point-to-point communication links are substantially equal to the minimum administrative weight of all point-to-point communication links directly interconnecting said particular successive pair of nodes that meet said quality-of-service requirement.

2. The method of claim 1 wherein said probabilistic rule is that said selected link is randomly selected from among said two or more point-to-point communication links directly interconnecting said particular successive pair of nodes.

3. The method of claim 2 wherein the random selection is based on a probability assigned to each of said two or more point-to-point communication links directly interconnecting said particular successive pair of nodes.

4. The method of claim 3 wherein said two or more point-to-point communication links directly interconnecting said particular successive pair of nodes are assigned equal probabilities.

5. The method of claim 3 wherein each of said two or more point-to-point communication links directly interconnecting said particular successive pair of nodes is assigned a probability that is a function of the amount of bandwidth available on said each or said two or more point-to-point communication links at the time of said selection.

6. The method of claim 1 wherein said two or more point-to-point communication links directly interconnecting said particular successive pair of nodes have a predetermined order and wherein said probabilistic rule is that the selecting is carried out in a round robin fashion based on said predetermined order.

7. The method of claim 1 wherein said quality-of-service requirement is a bandwidth required for said circuit.

8. The method of claim 1 wherein said quality-of-service requirement is a delay requirement for said circuit.

9. The method of claim 1 wherein said two or more point-to-point communication links interconnecting said particular successive pair of nodes are equal-cost links.

10. The method of claim 9 wherein said choosing is carried out using a Dijkstra's algorithm.

11. A method performed by a communication network for choosing a path for a circuit to be established in a communication network, said path including two or more nodes and a point-to-point communication link directly interconnecting each successive pair of nodes along said path, the method comprising identifying a plurality of paths through the network between a source node of said circuit and a destination node of said circuit, at least one of said paths comprising two or more links, and at least one of said paths including a selected one of two or more point-to-point communication links directly interconnecting a particular successive pair of nodes along that path, and choosing a particular one of said paths as the path for said particular circuit, wherein the selection of said selected link includes the application of a probabilistic rule, and wherein said two or more point-to-point communication links directly interconnecting said particular successive pair of nodes include only links directly interconnecting said particular successive pair of nodes that i) meet at least one quality-of-service requirement of the circuit, and ii) have an administrative weight equal to the minimum administrative weight of the links directly interconnecting said particular successive pair of nodes.

12. The method of claim 11 wherein said at least one quality-of-service requirement is one of a) a bandwidth requirement and b) a delay requirement.

13. A method performed by a communication network for choosing a path for a circuit to be established in a communication network, said network comprising a plurality of nodes and one or more point-to-point communication links directly interconnecting each of a plurality of pairs of said nodes, and said path including at least one of said pairs of nodes and a point-to-point communication link directly interconnecting each successive pair of nodes along said path, the method comprising identifying a plurality of paths through the network between a source node of said circuit and a destination node of said circuit, at least one of said paths including a selected one of two or more point-to-point communication links directly interconnecting a particular successive pair of nodes along that path, said two or more point-to-point communication links being links directly interconnecting said particular successive pair of nodes that have substantially equal cost, and choosing a particular one of said paths as the path for said particular circuit using a shortest-path algorithm, wherein the selection of said selected link includes the application of a probabilistic rule, and wherein said two or more point-to-point communication links directly interconnecting said particular successive pair of nodes include only links directly interconnecting said particular successive pair of nodes that
i) meet at least one quality-of-service requirement of the circuit, and
ii) have an administrative weight equal to the minimum administrative weight of the links directly interconnecting said particular successive pair of nodes.

14. The method of claim 13 wherein said at least one quality-of-service requirement is one of a) a bandwidth requirement and b) a delay requirement.

* * * * *